United States Patent [19]

Harada et al.

[11] Patent Number: 4,508,251
[45] Date of Patent: Apr. 2, 1985

[54] CABLE PULLING/FEEDING APPARATUS

[75] Inventors: Kazuhiro Harada, Mito; Yuzoh Tsuchiya, Yokohama; Nobuo Sekiguchi; Toshio Ishikawa, both of Sagamihara, all of Japan

[73] Assignees: Nippon Telegraph and Telephone Public Corp., Tokyo; Showa Electric Wire & Cable Co., Kanagawa, both of Japan

[21] Appl. No.: 436,856

[22] Filed: Oct. 26, 1982

[51] Int. Cl.³ .................... B65H 17/42; B65H 25/22
[52] U.S. Cl. ............................. 226/25; 226/43; 226/112; 226/172; 226/178; 254/265
[58] Field of Search .............. 226/25, 43, 112, 172, 226/178; 254/268, 265

[56] References Cited

U.S. PATENT DOCUMENTS

| 1,939,796 | 12/1933 | Spowart | 226/172 X |
| 3,275,300 | 9/1966 | Delacour et al. | 254/265 |
| 3,481,584 | 12/1969 | Conry et al. | 254/268 |
| 3,557,865 | 1/1971 | Gallucci | 226/25 |
| 3,658,222 | 4/1972 | Dressel et al. | 226/25 |
| 3,693,939 | 9/1972 | Buckson | 254/268 |
| 3,841,407 | 10/1974 | Bozeman | 254/265 X |

FOREIGN PATENT DOCUMENTS 846497 7/1981 U.S.S.R. ............................. 254/268

OTHER PUBLICATIONS

Juntaro Ishibashi et al., "Optical Fiber Cable Installing Technique in Underground Plant", *Japan Telecommunications Review*, Jul. 1981, pp. 261-270.

Primary Examiner—John M. Jillions
Attorney, Agent, or Firm—Pahl, Lorusso & Loud

[57] ABSTRACT

A cable pulling/feeding apparatus comprises a fixed base, a cable pulling/feeding unit having a drive/brake unit for pulling or feeding a cable, a sensor supported on the fixed base so as to be movable in both directions in which the cable is pulled and fed for detecting a load imposed between the cable pulling/feeding unit and the fixed base and for generating an electric signal dependent on the load as detected, and structure for determining a load applied to the drive/brake unit in response to the electric signal when the cable is pulled or fed.

4 Claims, 15 Drawing Figures

CABLE PULLING/FEEDING APPARATUS

BACKGROUND OF THE INVENTION

The present invention relates to a cable pulling/feeding apparatus used when a cable is to be installed or manufactured.

Cables are normally installed through a tube or the like by a cable pulling unit. When the cable is subjected to an excessive tension while being pulled by the cable pulling unit, the cable is adversely affected by such an undue tensioning force. For optical fiber cables, extremely longer lengths of optical fiber cable as compared with conventional metal cables are installed to reduce splice losses. When such an optical fiber cable is tensioned excessively, it can be elongated or bent and will cause an optical transmission loss. Various protective measures have been proposed to prevent such an undue tension from being imposed on the cable. One such proposal enables the cable pulling unit to rotate idly when the tension applied to the cable exceeds an allowable level. According to another prior effort, an electric current to be supplied to a drive motor in the cable pulling unit is limited to a predetermined value so that the drive motor will not produce a drive force greater than a certain level. These conventional arrangements thus detect and control the torque of the cable pulling unit mechanically or electrically. However, where the power transmission mechanism is complicated, the mechanical loss is large in proportion and the correct tension can not be measured, with the result that the correct torque control is difficult to achieve.

There is known a method of measuring the tension of a wire by detecting a displacement of a movable roller held against the wire to cause the latter to travel along a curved path. This method is disadvantageous in that the wire undergoes unwanted pressure from the movable roller and is subjected to resistance to travel by the movable roller.

SUMMARY OF THE INVENTION

The above-described drawbacks in the prior art apparatus have been successfully eliminated by the present invention.

It is a primary object of the present invention to provide a cable pulling/feeding apparatus for detecting the tension of a cable with a sensor with only a small error involved, and for controlling the force with which the cable is driven or braked while being pulled or fed along in response to an output from the sensor.

According to the present invention, the above object can be achieved by a cable pulling/feeding apparatus comprising a fixed base, a cable pulling/feeding unit having a drive/brake unit for pulling or feeding a cable, a sensor supported on the fixed base so as to be movable in both directions in which the cable is pulled and fed for detecting a load imposed between the cable pulling-/feeding unit and the fixed base and for generating an electric signal dependent on the load as detected, and structure for determining a load applied to the drive/brake unit in response to the electric signal when the cable is pulled or fed.

These and other objects of the invention will become apparent from the following description of an embodiment thereof when taken together with the drawings.

BRIEF DESCRIPTION OF THE DRAWINGS

FIG. 1 is a schematic diagram illustrative of the conventional manner in which a wire is measured for tension it is subjected to;

DETAILED DESCRIPTION OF THE PREFERRED EMBODIMENT

Figure 1:
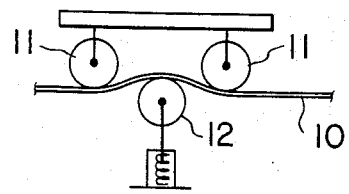

FIG. 1 shows a conventional method of measuring the tension of a wire 10 while is is being fed along. The wire 10 as it travels is forcibly guided to move along a tortuous path by two fixed rollers 11 and a single movable roller 12. The tension of the wire 10 can be determined by a displacement of the movable roller 12. The prior method, however, has proven unsatisfactory in that the wire undergoes unwanted pressure for tension measurement and suffers from a relatively large resistance to travelling movement where the wire is pressed sideways.

Figure 2:
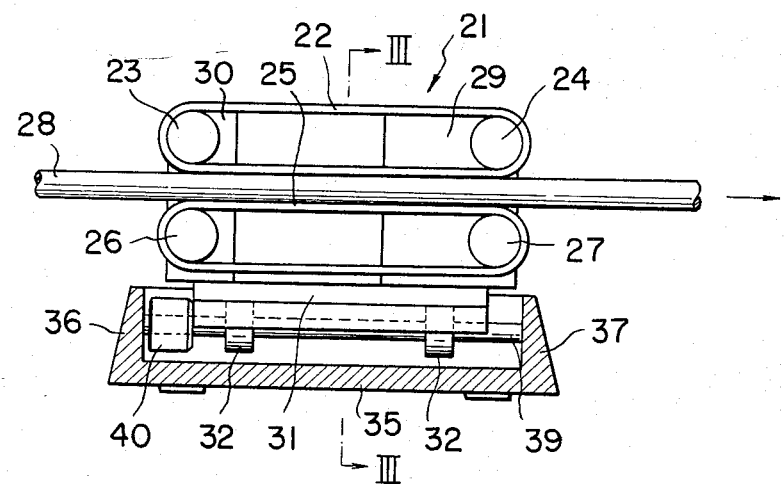
FIG. 2 is a side elevational view, partly in cross section, of a cable pulling/feeding apparatus according to the present invention.
Figure 3:
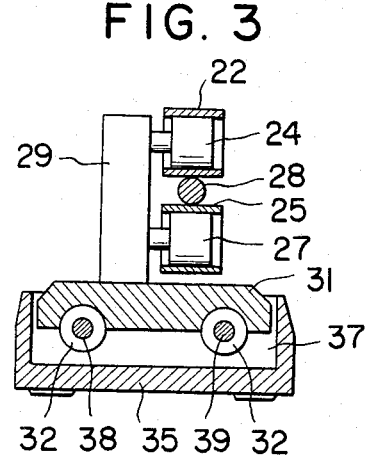
FIG. 3 is a cross-sectional view taken along line III—III of FIG. 2.

FIGS. 2 and 3 show an apparatus for pulling and feeding a cable according to the present invention. The apparatus includes a cable pulling unit 21 comprising a pair of upper wheels 23, 24, a pair of lower wheels 26, 27, and a pair of endless belts 22, 25 extending around the upper wheels 23, 24 and the lower wheels 26, 27, respectively, for sandwiching and gripping a cable 28 therebetween.

Figure 4:
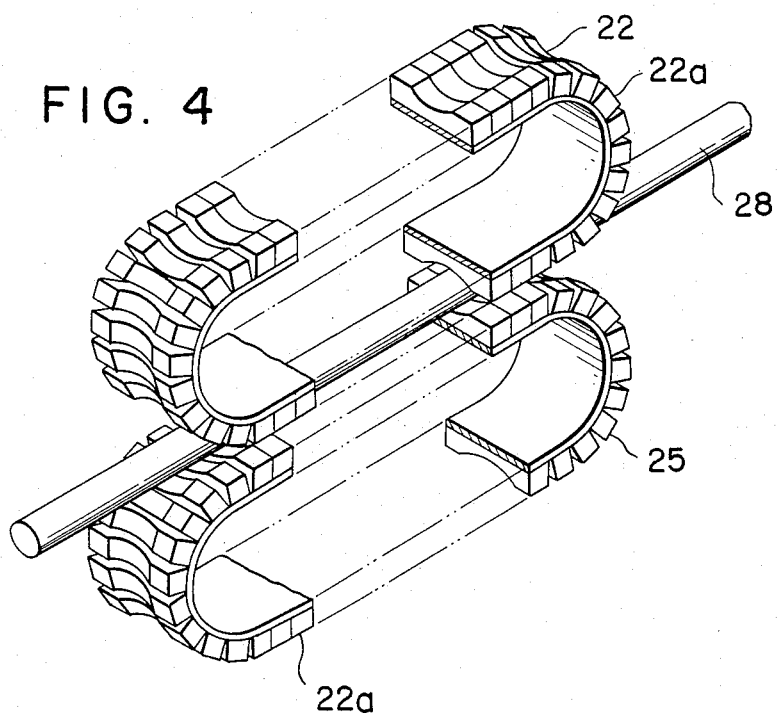
FIG. 4 is a perspective view of a pair of belts in the apparatus shown in FIGS. 2 and 3.
Figure 5A:
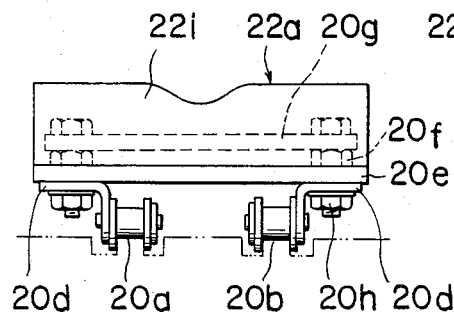
FIGS. 5a and 5b are end and side elevational views, respectively, of a portion of the belt.
Figure 5B:
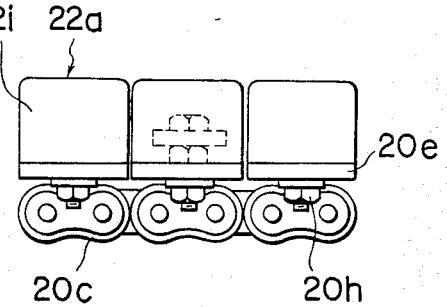

The endless belts 22, 25 are shown in more detail in FIG. 4. Each endless belt comprises a pair of chains 20a, 20b composed of a plurality of chain units 20c each having a rubber block 22a (FIGS. 5a and 5b). More specifically, each chain unit 20c includes a pair of brackets 20d to which a holder plate 20g is fastened by bolts and nuts 20h with a reinforcement plate 20e and spacers 20f interposed therebetween. A rubber body 22i is molded on the chain unit to thereby form the rubber block 22a. The chains 20a, 20b are wound around each of the pairs of upper wheels 23, 24 and the lower wheels 26, 27.

A drive/brake unit 29 comprises a drive motor (not shown), a power tranmission mechanism (not shown) such as a train of gears for transmitting rotative power from the drive motor to the wheels 24, 27, and a box in which the drive motor and the power transmission mechanism are housed.

The cable pulling unit 21 also includes a wheel support 30 on which shafts of the wheels 23, 26 are supported, and a support base 31 supporting the wheel support 30 and the drive/brake unit 29 thereon. A plurality of laterally spaced front and rear ball bearings 32 are disposed below and attached to the support base 31. The rods 38 and 39 for the front and rear ball bearings 32 are aligned in the direction in which the upper and lower runs of the belts 22, 25 move. A base 35 supports thereon the cable pulling unit 21 so that the latter is movable in the direction of movement of the upper and lower runs of the belts 22, 25, the base 35 being fixed to a floor or the like against displacement.

Figure 6A:
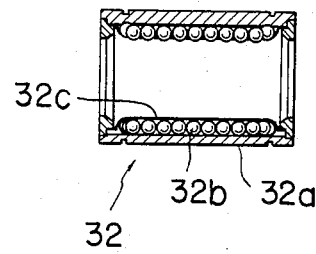
FIGS. 6a through 6c are diagrams showing a bearing in the apparatus of FIGS. 2 and 3.
Figure 6B:
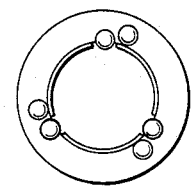
Figure 6C:
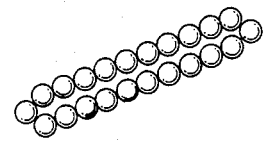

As shown in FIG. 6a, each ball bearing 32 comprises a support sleeve 32a, a holder 32c mounted therein, and a plurality of bearing balls 32b accommodated in the holder 32c. The bearing balls 32b are divided into several groups, three in the illustrated embodiment, which are angularly spaced 120' from each other as shown in FIG. 6b and arranged axially of the holder 32c. The bearing balls 32b in each group are disposed in the form of a loop as shown in FIG. 6c in which the bearing balls 32b circulate or move around. A rod (such as 38, 39) extending through the ball bearing 32 can move axially smoothly while being subjected to only a very small frictional force. For the ball bearing 32, "Ball bush for antifriction linear motion", size N-69 class, manufactured by SAN·A·SEIKI, Inc., Tokyo, Japan has been used.

The upper wheels 23, 24 or the lower wheels 26, 27 are vertically movable so that the distance between the belts 22, 25 will automatically be adjusted vertically to accommodate cables of different diameters or dimensions to be sandwiched therebetween.

Figure 7:
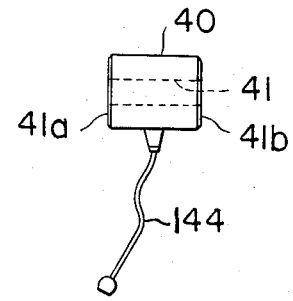
FIG. 7 is a side elevational view of a sensor in the apparatus of FIGS. 2 and 3.

A sensor 40 comprises a load cell for detecting a force which the cable pulling unit 21 imposes on the base 35 through its end faces 41a, 41b (FIG. 7) when the cable is pulled and for generating a voltage dependent on such a force. The sensor 40 has a central through hole 41 through which the guide rod 38 is freely movable axially. The output voltage from the sensor can be picked up via a lead wire 144. "C2M1" manufactured by BLH Electronics, Inc. has been used for the load cell.

Figure 8A:
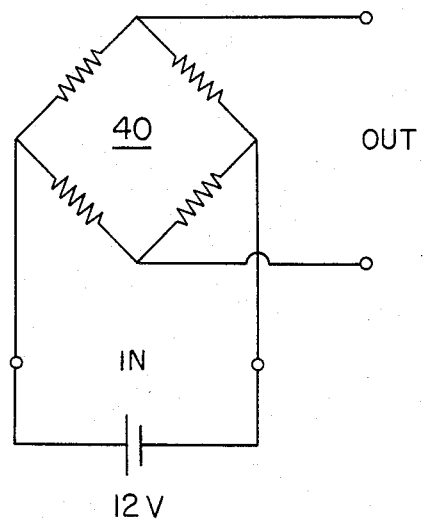
FIG. 8a is an equivalent circuit diagram of the sensor illustrated in FIG. 7.

A control circuit for processing an electric signal issued by the sensor 40 and controlling a load to be applied to the drive/brake unit 29 in the cable pulling unit 21 will be described with reference to FIGS. 8a through 8c.

Figure 8B:
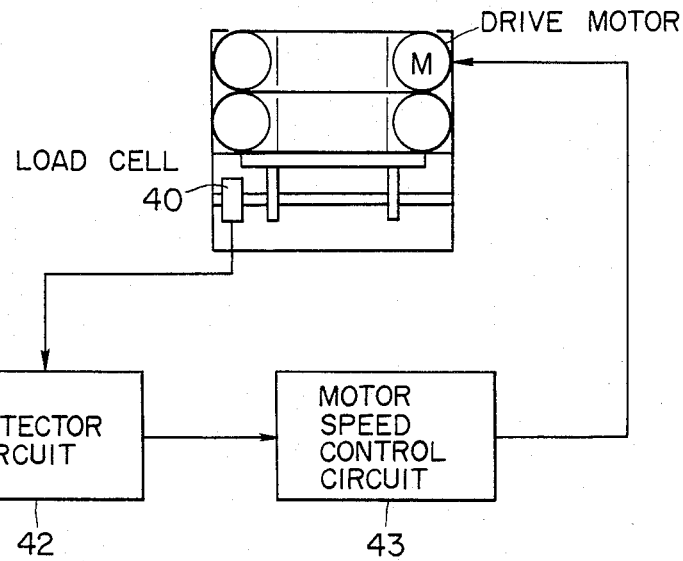
FIGS. 8b and 8c are block diagrams of a control circuit for controlling a drive/brake device in response to an electric signal from the sensor.

As shown in FIG. 8b, an output from the load cell 40 is supplied as an input to a detector circuit 42, and an output from the detector circuit 42 is supplied as an input to a motor speed control circuit 43. In FIG. 8a, the load cell is composed of a circuit equivalent to a resistance bridge which produces an output of 0 volt with a power supply voltage of 12 volts being applied across input terminals when the load cell undergoes no pressure. When a pressure is imposed on the load cell, the bridge is brought out of balance and produces a voltage output (OUT) dependent on the pressure applied.

Figure 8C:
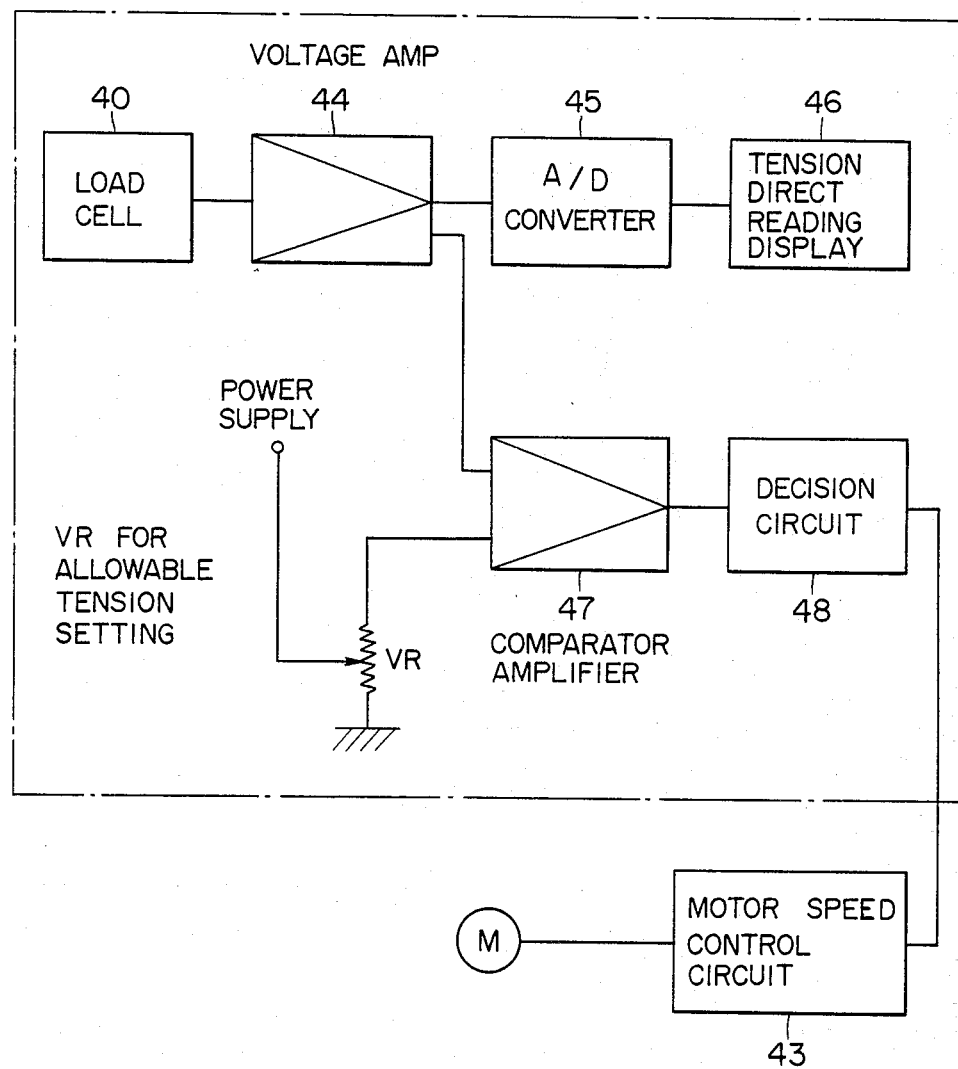

Such a voltage output is amplified by a voltage amplifier 44 of a high input impedance as shown in FIG. 8c. The amplified voltage is converted into a digital signal for direct reading by an analog-to-digital converter 45 so that the pressure or tension imposed on the cable can directly be read on a display unit 46.

The voltage signal from the load cell as amplified by the voltage amplifier 44 is compared by a comparator and amplifier 47 with a reference voltage determined by an allowable tension setting variable resistor VR to enable a decision circuit 48 to determine whether the load cell 40 is excessively loaded or subjected to a force greater than a predetermined level.

When the decision circuit 48 determines that the load cell is under an excessive load, a switch, for example, in the decision circuit 48 is turned on to actuate a relay for breaking a power supply circuit in the motor speed control circuit 43 for the drive motor M. Where the drive motor M is controlled for speed by a phase control circuit having thyristors, the output from the decision circuit may be delivered to the phase control circuit for reducing the electric power supplied to the drive motor M.

Figure 9A:
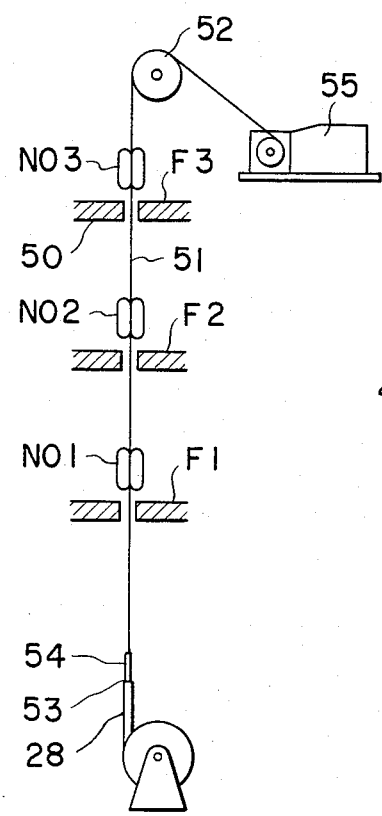
FIGS. 9a and 9b are schematic showing illustrative of the way in which the apparatus according to the present invention is used.
Figure 9B:
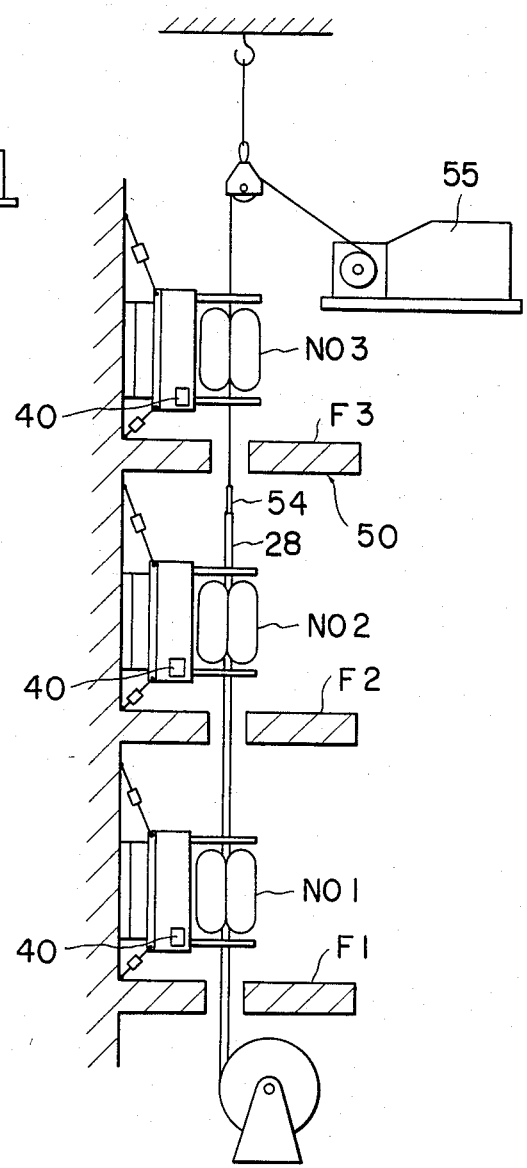

Operation of the apparatus will be described with reference to an application in which a cable 28 is installed through floors F1-F3 of a building 50 as illustrated in FIGS. 9a and 9b.

The floors F1-F3 have apparatus Nos. 1-3 of the invention mounted thereon, respectively. When the cable 28 is to be installed, a wire 51 is lowered via a guide pulley 52 to a distal end 53 of the cable 28, and connected to the distal end 53 of the cable 28 by a pulling eye 54 as shown in FIG. 9a. Then, a winch 55 is rotated to pull up the cable 28.

When the pulling eye 54 goes past the first apparatus No. 1 as shown in FIG. 9b, the first apparatus No. 1 starts gripping and pulling up the cable 28. Then, the second and third apparatus Nos. 2 and 3 are successively started to pull up the cable 28, so that the cable 28 will not sag between the apparatus Nos. 1-3. At this time, the load cell 40 in each apparatus is subjected to the load of the apparatus itself and the downward tension applied to the cable 28. When the second apparatus No. 2 pulls up the cable 28 faster than the first apparatus No. 1 does, any sag of the cable 28 between the first and second apparatus Nos. 1 and 2 is eliminated, and a tension greater than the weight of a portion of the cable 28 between the first and second apparatus Nos. 1 and 2 is imposed on the second apparatus No. 2, whereupon the load cell 40 in the latter detects such an increased tension to immediately stop the second apparatus No. 2. Then, the cable 28 slackens between the first and second apparatus Nos. 1 and 2. Accordingly, the apparatus Nos. 1 through 3 are operated functionally in ganged relation, though not under central control for their coaction, so that the cable 28 will be installed under a tension below a predetermined value.

A compressive force imposed on the detector 40 is equivalent to the force of withdrawal of the cable 28, from which a frictional force acting between the ball bearings 32 and guide shafts 38, 39 is subtracted. Since such a frictional force can be quite small, the compressive force acting on the detector 40 is substantially equal to the force with which the cable 28 is pulled, or the tension under which the cable 28 is placed.

Although in the foregoing embodiment the apparatus of the invention has been described as being used to pull the cable, the apparatus can equally be employed for feeding the cable while it is being installed or for pulling the cable while it is being manufactured.

The ball bearings attached below the cable pulling unit 21 have been shown as fitting over the guide shafts 38, 39 mounted on the base 35 to allow free movement of the cable pulling unit 21 along the guide shafts 38, 39. However, rails may be mounted on the base 35 and the cable pulling unit 21 may have upper and lower wheels vertically sandwiching the rails so that the cable pulling unit 21 can freely move along the rails. Alternatively, the base 35 may have a plurality of rollers arranged in upper and lower positions, and the cable pulling unit 21 may be provided with plates supported at their ends on legs projecting downwardly from front and rear portions of the cable pulling unit 21 and sandwiched between the upper and lower rollers, whereby the cable pulling unit 21 can freely move back and forth. The sensor 40 may comprise a load cell capable of detecting a tensile force, the load cell being interposed between the front end of the cable pulling unit 21 and the front wall of the base 35. As an alternative, the load cell may be replaced with a wire strain gage element attached to a spring for the detection of strain. The base 35 may be mounted on legs so as to be adjustable in height.

With the arrangement of the present invention, the quantity to be detected by the sensor is subjected only to an error due to a frictional force that acts between the cable pulling unit and the base which can greatly be reduced by the devices disclosed herein. Consequently, the force with which the cable is pulled or fed, and hence the tension of the cable can be measured with high precision. The brake/drive unit can be controlled by an electric output generated by the sensor so that the cable will be prevented from suffering from damages which would otherwise be caused by an excessive tension larger than an allowable tension imposed on the cable, or the cable will not be pulled or fed along under a tension smaller than required.

Thus, there is provided in accordance with the invention a cable pulling/feeding apparatus which has the advantages discussed above. The embodiment described is intended to be merely exemplary and those skilled in the art will be able to make variations and modifications in them without departing from the spirit and scope of the inventions. All such modifications and variations are contemplated as falling within the scope of the claims.

What is claimed is:

1. A cable pulling/feeding apparatus comprising:
    a stationary base;
    a carriage mounted through bearings on at least one stationary guide shaft mounted on said base for reciprocating movement and a pair of endless belts for frictionally engaging a straight run of the cable therebetween and cooperating to pull or feed the cable linearly therethrough, said endless belts being rotatably mounted on said carriage allowing reciprocating linear movement of said endless belts relative to said base, in the direction of the travel of the cable; and
    a load cell slidably mounted on said guide shaft between said carriage and said base, for producing an electric signal which varies in accordance with pressure applied on said load cell.

2. The apparatus of claim 1 wherein said shaft is aligned in the direction of rotation of said endless belts.

3. The apparatus of claim 1 wherein each of said endless belts comprises a plurality of blocks contoured to grip the cable and a pair of chains, each link in said chain carrying, fastened thereto, one end of one of said blocks.

4. The apparatus of claim 3 wherein said blocks are rubber.

* * * * *